L. C. KNEE.
CAMERA SHUTTERS AND MEANS FOR OPERATING THE SAME.
APPLICATION FILED SEPT. 27, 1910.
1,001,048.
Patented Aug. 22, 1911.
2 SHEETS—SHEET 1.
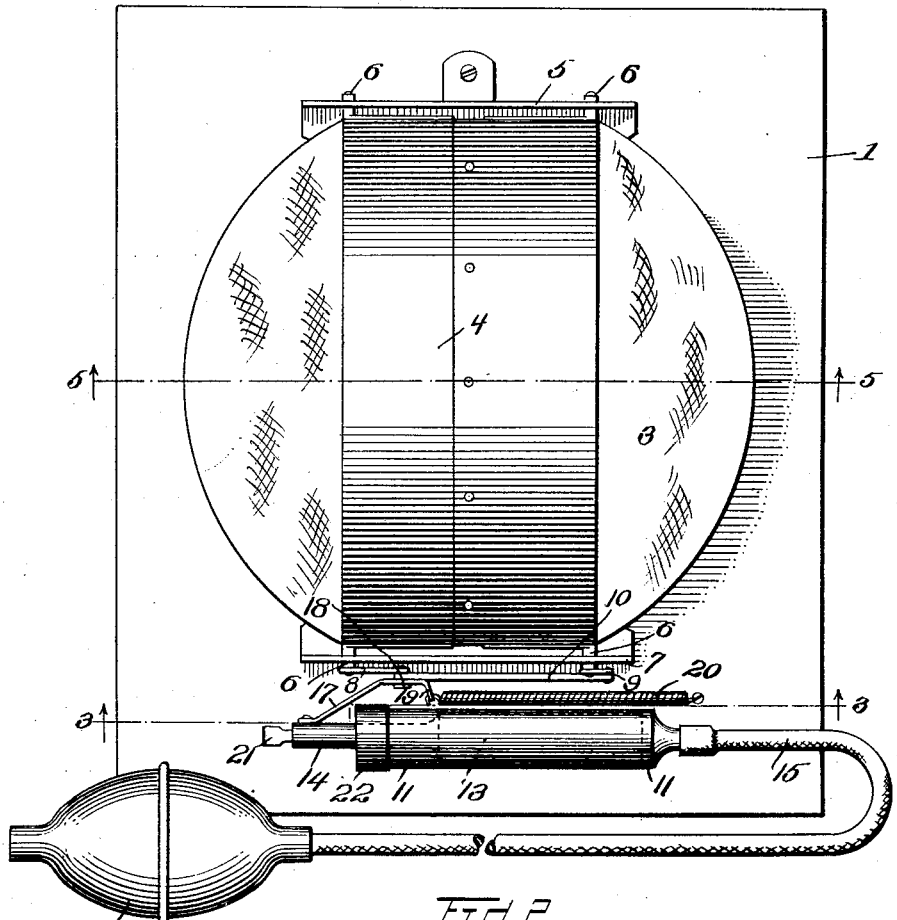
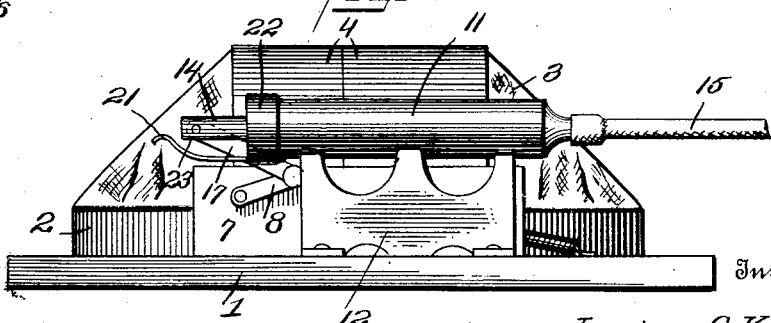
Witnesses
H. Strauss
R. H. Krenkel
Inventor
Lucious C. Knee
By Joshua R. H. Totts.
Attorney
COLUMBIA PLANOGRAPH CO., WASHINGTON, D. C.

L. C. KNEE.
CAMERA SHUTTERS AND MEANS FOR OPERATING THE SAME.
APPLICATION FILED SEPT. 27, 1910.
1,001,048.
Patented Aug. 22, 1911.
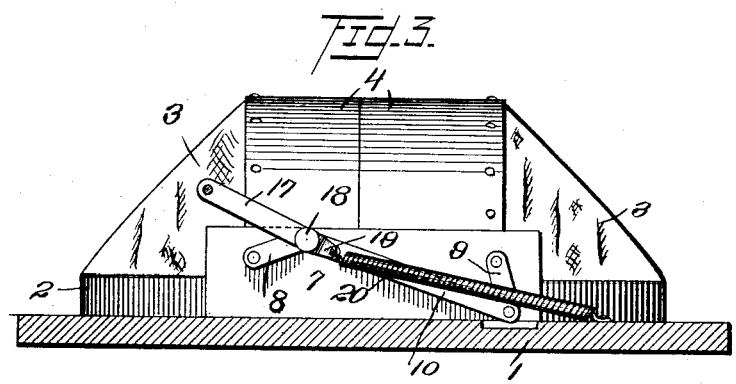
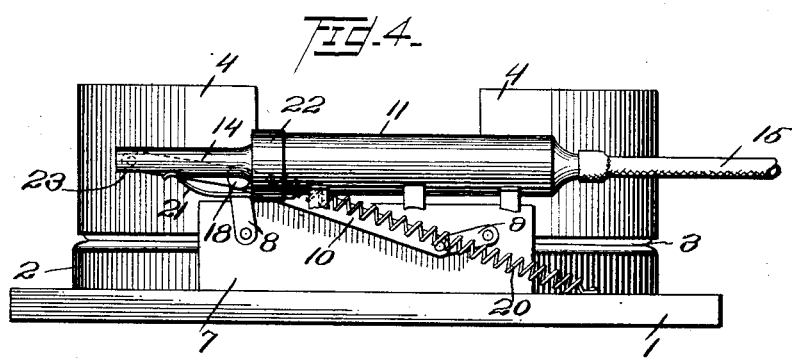
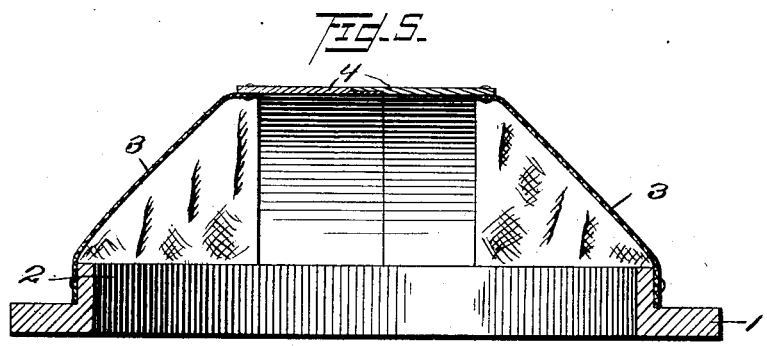
Witnesses
H. Strauss
R. N. Krenkel.
Inventor
Lucious C. Knee
By Joshua R. H. Potts.
Attorney

UNITED STATES PATENT OFFICE.

LUCIOUS CHARLES KNEE, OF PHILADELPHIA, PENNSYLVANIA, ASSIGNOR OF ONE-HALF TO ALFRED CLEMENTS, OF PHILADELPHIA, PENNSYLVANIA.

CAMERA-SHUTTERS AND MEANS FOR OPERATING THE SAME.

1,001,048.

Specification of Letters Patent. Patented Aug. 22, 1911.

Application filed September 27, 1910. Serial No. 584,110.

*To all whom it may concern:*

Be it known that I, LUCIOUS CHARLES KNEE, a citizen of the United States, residing at Philadelphia, in the county of Philadelphia and State of Pennsylvania, have invented certain new and useful Improvements in Camera-Shutters and Means for Operating the Same, of which the following is a specification.

My invention relates to improvements in camera shutters, and means for operating the same, an object of the invention being to provide improved operating mechanism which will permit the shutters to be operated pneumatically from a distance so as to insure an exposure of the desired length of time.

Heretofore camera shutters operated pneumatically have relied upon the pressure of a bulb to hold the shutters opened, but such an exposure is not accurate for the reason that there is more or less escape of air and the shutters often begin to close before the time of exposure is completed. To overcome this, and cause the shutters to remain open as long as desired, the present invention was devised, and will be hereinafter described in detail.

With these and other objects in view, the invention consists in certain novel features of construction and combinations and arrangements of parts, as will be more fully hereinafter described and pointed out in the claims.

In the accompanying drawings: Figure 1, is a view in front elevation illustrating my improvements. Fig. 2, is an end elevation of Fig. 1. Fig. 3, is a view in section on the line 3—3 of Fig. 1. Fig. 4, is an end elevation with the parts removed for purposes of clearness, and Fig. 5, is a view in section on the line 5—5 of Fig. 1.

1, represents a plate or frame constituting a part of the camera having a circular flange 2 around the opening therein, and to this flange the flexible portions 3 of the shutters are secured in any approved manner, connecting the same with curved bands 4, 4, the meeting edges of the latter normally overlapped so as to exclude the light from the camera. These bands 4, 4, are pivotally connected to brackets 5 and 7 respectively by means of hinge pins 6, and the brackets are secured to frame 1. The ends of hinge pins 6, which project through the lower brackets 7, are provided with crank arms 8 and 9 respectively, and these crank arms are connected by a link 10 compelling the pins 6 to turn together, but in opposite directions so as to open and close both shutters simultaneously.

11, represents a cylinder supported on a bracket 12 fixed to frame 1, and containing a piston 13 having a rod 14 projecting at one end from the cylinder. To the opposite end of cylinder 11, a tube 15 is connected, which at its free end is provided with a bulb 16 to operate the piston 13 in cylinder 11. A link 17 is connected to rod 14 at one end, and between its ends is pivotally connected to the crank pin 18, which connects crank arm 8 with link 10. The other end of this link 17 is bent outward and perforated as shown at 19 to receive one end of a coiled spring 20, the opposite end of said spring being secured to frame 1, and not only tending to hold the shutters in closed position, but also exerting a pull on the rod 17 to return the piston to normal position.

21, is a spring which at one end is clamped to cylinder 11 by means of a spring band 22. The free end of the spring 21 curves upwardly as shown, and engages the flattened lower face 23 of rod 14 with sufficient frictional engagement to hold the piston rod in its outward position, as well as hold the shutters in their open position against the action of spring 20, when the suction is relieved on the bulb 16.

It is to be understood that one end of the bulb 16 is open, and the operator must with his thumb close this opening in the end of the bulb when he desires to open the shutters, and after he has opened them to relieve the suction on the piston, he lifts his thumb from over the opening in the bulb, and spring 21 is sufficiently strong to hold the shutters open, but not sufficiently strong to maintain them open when the bulb is again compressed, the compression of the bulb with its end open causing a suction of the bulb which together with the strength of spring 20 overcomes the frictional engagement of spring 21, and quickly closes the shutters. It will therefore be noted that with a structure such as above described, the shutters may be opened and held open for any desired length of time, and then quickly closed, rendering the action a positive one and overcoming the defects of similar devices heretofore in use.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a mechanism of the character described, the combination with a frame having an opening therein, and shutters normally closing said opening, of an air cylinder secured to the frame, a piston in said cylinder, a rod secured to the piston and projecting from one end of the cylinder, mechanism between said rod and said shutters, whereby when said rod is moved in one direction, the shutters will be opened, a spring normally closing said shutters, and means frictionally engaging said rod to hold said rod against the action of said spring and maintain the shutters in open position, substantially as described.

2. In a mechanism of the character described, the combination with a frame having an opening therein, and shutters normally closing said opening, of an air cylinder secured to the frame, a piston in said cylinder, a rod secured to the piston and projecting from one end of the cylinder, mechanism between said rod and said shutters, whereby when said rod is moved in one direction, the shutters will be opened, a spring normally closing said shutters, and a spring frictionally engaging the said rod to hold said rod against the action of said spring and maintain the shutters in open position, substantially as described.

3. In a mechanism of the character described, the combination with a frame having an opening therein, and shutters normally closing said opening, of an air cylinder secured to the frame, a piston in said cylinder, a rod secured to the piston and projecting from one end of the cylinder, mechanism between said rod and said shutters, whereby when said rod is moved in one direction, the shutters will be opened, a spring normally closing said shutters, a spring secured at one end to the cylinder, and bearing at its other end against said rod to hold said rod against the action of said spring and maintain the shutters in open position, substantially as described.

4. In a mechanism of the character described, the combination with a frame having an opening therein, and shutters normally closing said opening, of an air cylinder secured to the frame, a piston in said cylinder, a rod secured to the piston and projecting from one end of the cylinder, mechanism between said rod and said shutters, whereby when said rod is moved in one direction, the shutters will be opened, a spring normally closing said shutters, said rod flattened along one face, a spring, a spring band securing said spring to said cylinder, and the free end of said last-mentioned spring bearing against the flattened portion of said rod to hold said rod against the action of said spring and maintain the shutters in open position, substantially as described.

5. In a device of the character described, the combination with a frame having an opening therein, brackets secured to the frame, curved metal bands hinged to said brackets, and having their edges normally overlapped, a flange around said opening, flexible material connecting said bands with said flange, a spring normally holding said bands together, pneumatic means for forcing said bands apart to open the shutters, and friction means holding said shutters in open position, substantially as described.

In testimony whereof I have signed my name to this specification in the presence of two subscribing witnesses.

LUCIOUS CHARLES KNEE.

Witnesses:
R. H. KRENKEL,
CHAS. E. POTTS.

---

Copies of this patent may be obtained for five cents each, by addressing the "Commissioner of Patents, Washington, D. C."